No. 897,761. PATENTED SEPT. 1, 1908.
A. MENZ.
ANIMAL TRAP.
APPLICATION FILED DEC. 6, 1907.
2 SHEETS—SHEET 2.
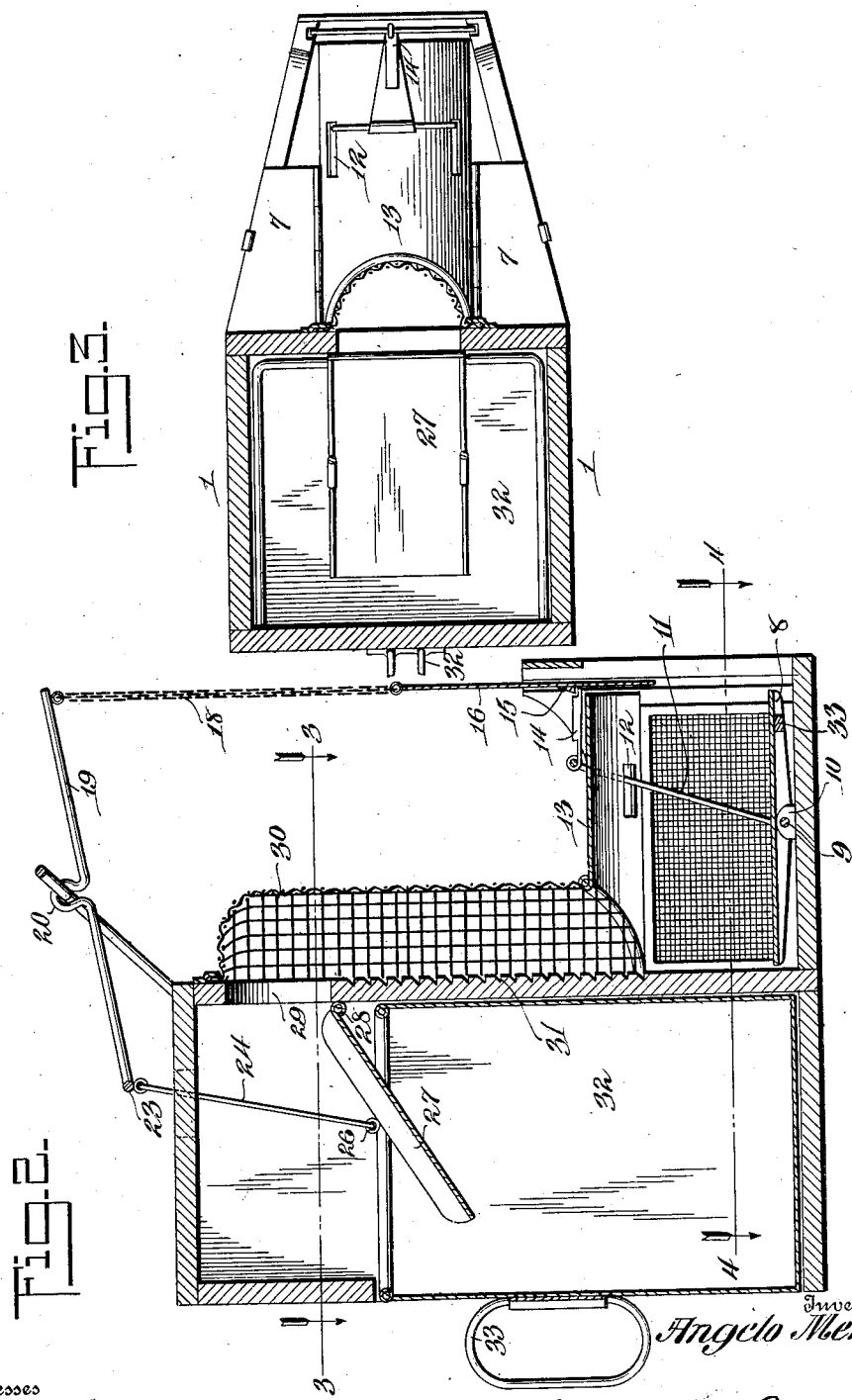
Witnesses
Louis C. Starke
F. W. Bunger
Inventor
Angelo Menz,
By Victor J. Evans
Attorney

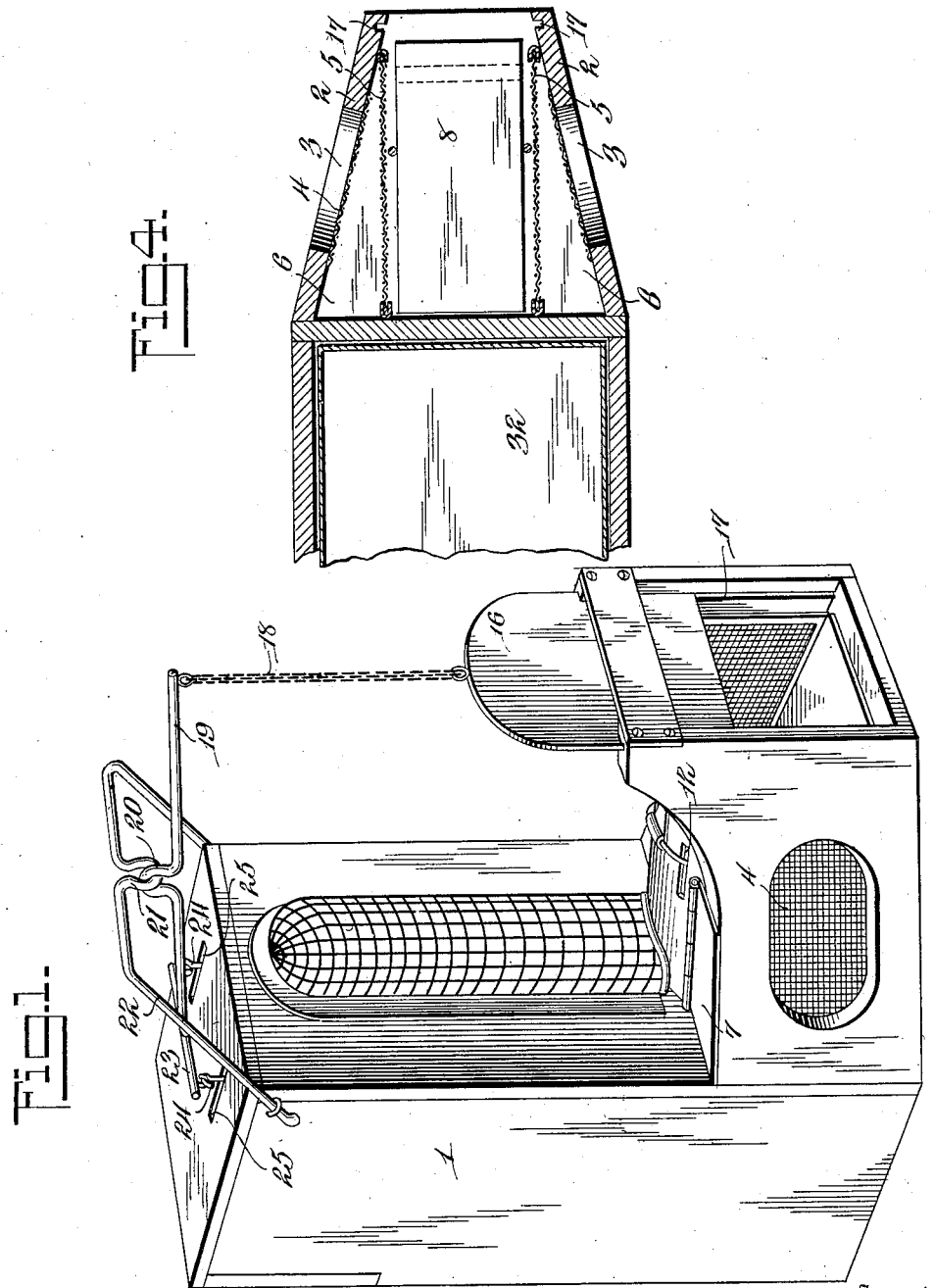

UNITED STATES PATENT OFFICE

ANGELO MENZ, OF NEWPORT NEWS, VIRGINIA.

ANIMAL-TRAP.

No. 897,761.    Specification of Letters Patent.    Patented Sept. 1, 1908.

Application filed December 6, 1907. Serial No. 405,416.

*To all whom it may concern:*

Be it known that I, ANGELO MENZ, a citizen of the United States of America, residing at Newport News, in the county of Warwick and State of Virginia, have invented new and useful Improvements in Animal-Traps, of which the following is a specification.

This invention relates to animal traps, and one of the principal objects of the same is to provide means whereby the captured animal will set the trap for the next one and in which the bait while in sight of the animal cannot be eaten by the victims caught in the trap.
Another object of the invention is to provide a trap of simple construction in which a number of animals may be caught without setting the trap or being required to furnish new bait.
These and other objects may be attained by means of the construction illustrated in the accompanying drawings, in which:—

Figure 1 is a perspective view of an animal trap made in accordance with my invention.
Fig. 2 is a central front to rear section of the same. Fig. 3 is a horizontal section on the line 3—3, Fig. 2, looking in the direction indicated by the arrow. Fig. 4 is a horizontal section on the line 4—4, Fig. 2, looking in the direction indicated by the arrow.

Referring to the drawings for a more specific description of my invention, the numeral 1 designates the body portion of the trap, and extending in front of the portion 1 is an entrance vestibule 2 comprising converging sides each having an opening 3 therein, said opening being covered by a wire cloth screen 4. A wire cloth screen 5 extends from near the front to the back of the vestibule and provides upon opposite sides of the entrance a bait chamber 6 designed to be filled with bait which is always within sight of an animal through the windows or apertures 3 and also within the vestibule through the screen
5. Hinged doors 7 cover the tops of the bait chambers 6. A tilting platform 8 is pivoted at 9 to a lug 10 secured to the floor of the vestibule. Connected to the tilting platform 8 is a wire bail 11, said bail being rigidly secured to the platform at its lower ends and the two legs of said bail extending through slots 12 in the rounded top 13 of the vestibule. Connected to the bail 11 is a trigger 14 designed to engage a projection 15 formed on a sliding door 16, said door being fitted in guideways 17 in the opposite sides of the vestibule. The door is supported from above by a chain or other flexible connection 18 connected to a lever 19, said lever having a loop 20 formed therein, and said loop 20 engaging a similar loop 21 formed upon a supporting bracket 22 secured to the sides of the body portion of the trap, as shown more particularly in Fig. 1. On the rear end of the lever 19 is a cross bar 23, and connected to said cross bar are a pair of links 24, said links extending through slots 25 in the top of the trap. The links 24 are pivotally connected at 26 to a door 27 hinged at 28 inside the trap 1, and an inlet opening 29 is formed in the front wall of the trap, and a wire cloth guard 30 extends above the opening and down to the upper side of the vestibule, said guard being substantially semi-circular in section and opening into the vestibule at its lower end. Within the vestibule the front wall of the trap is provided with a series of steps 31 which will permit an animal to climb up and enter through the opening 29.

Fitted to slide in the back of the trap is a metal casing 32 provided with suitable handles 33. The casing 32 has an open upper end, and the door 27 falls within the casing 32 when the door 16 is raised.

The operation of my invention may be briefly described as follows: An animal attracted by the odor of the bait will pass into the vestibule and upon the platform 8. As the platform tilts backwardly the trigger 14 is withdrawn from under the projection 15, and the door 16 drops by gravity and closes the entrance to the vestibule. When the door 16 is closed the door 27 is raised upward to a substantially horizontal plane. As the animal ascends the stairs in the guard 30 and passes into the aperture 29 on to the door 27 the latter is tipped to the position shown in Fig. 2 to drop the animal into the casing 32. As the door 27 drops it raises the door 16, and the trigger 14 is moved under the projection 15 by means of the weight 33 under the front portion of the platform 8. Thus the trap is set by the entrapped animal.

My invention is of simple construction, requires but little attention, does not use up the bait and is efficient and reliable in use.

Having thus described the invention, what is claimed as new, is:—

A trap comprising a main trap portion provided with an opening near its upper end, a vestibule connected thereto, a platform pivoted in the vestibule, a bail carried by the platform, a trigger connected to the bail, a sliding door held open by the trigger, a lever, a chain connected to said lever and to said door, a bail at the top of the main trap portion and provided with a T-shaped head, said lever being supported upon said bail links supported upon said head and passing through slots in the top of the main trap portion, and a hinged door to which said links are connected.

In testimony whereof I affix my signature in presence of two witnesses.

ANGELO MENZ.

Witnesses:
 WM. VOSSILA,
 G. GUAGUCLI.